INVENTOR
GEORGE F. ANDREWS

*Stowell & Stowell*
ATTORNEYS

April 21, 1970     G. F. ANDREWS     3,508,259
SFERICS-TO-RADAR DATA CONVERTER

Filed Nov. 29, 1968     6 Sheets—Sheet 4

INVENTOR
GEORGE F. ANDREWS

Stowell & Stowell
ATTORNEYS

INVENTOR
GEORGE F. ANDREWS

ATTORNEYS

April 21, 1970 G. F. ANDREWS 3,508,259
SFERICS-TO-RADAR DATA CONVERTER
Filed Nov. 29, 1968 6 Sheets-Sheet 6

INVENTOR
GEORGE F. ANDREWS

Stowell & Stowell
ATTORNEYS

United States Patent Office 3,508,259
Patented Apr. 21, 1970

3,508,259
SFERICS-TO-RADAR DATA CONVERTER
George F. Andrews, Miami, Fla., assignor to Research Corporation, New York, N.Y., a non-profit corporation of New York
Filed Nov. 29, 1968, Ser. No. 779,961
Int. Cl. G01s 9/00; G01w 1/02, 1/16
U.S. Cl. 343—6
17 Claims

ABSTRACT OF THE DISCLOSURE

A single cathode-ray tube (PPI) display of both sferics information and rho-theta radar information is provided so as to permit simultaneous viewing of both signals. A time-sharing display system, where the innermost portion of the PPI is used to portray the sferics data in 5.6 degree sectors in the form of vectors, with vector length being proportional to output data of the sferic sensor in each of 64 sectors. The sferics data is converted to video signals which appear on the PPI display, while the normal radar video is inhibited. The radar video then occupies the remaining display time, and thus appears on the outermost portion of the PPI.

---

The invention herein described was made in the course of or under a contract with the Department of the Navy.

Numerous devices have been employed in the study of atmospheric electrical activity. Past techniques have used multiple sensors to perform triangulation measurements on thunderstorm sferics and, using closed circuit television, have formed a composite display of the output derived from the multiple sensors. Triangulation measurements and composite TV display techniques provide a display which is difficult to interpret. Further, the elaborate equipment and attendant skilled personnel required for operation thereof, results in a serious economic and operational handicap.

These disadvantages are overcome by the present invention which provides a time-sharing display that enables use of a single cathode-ray tube to receive and display both sferics and radar data. Analysis and interpretation of the combined sferics and radar data is simplified by the simultaneous display which provides a flexible presentation which may be rapidly and conveniently scaled, expanded, etc., with no loss of time or accuracy. Thus, a primary object of the present invention is to provide a single station system for identifying thunderstorm precipitation echoes and sferics activity as displayed on a single PPI display.

Another object of the present invention is to provide a data converter to permit simultaneous cathode-ray tube display of sferics activity and radar echoes, which may be simply added to existing weather radar installations.

Further objects of the present invention and their attendant advantages will become apparent upon reading the following description with reference to the accompanying drawings.

Figure 1:
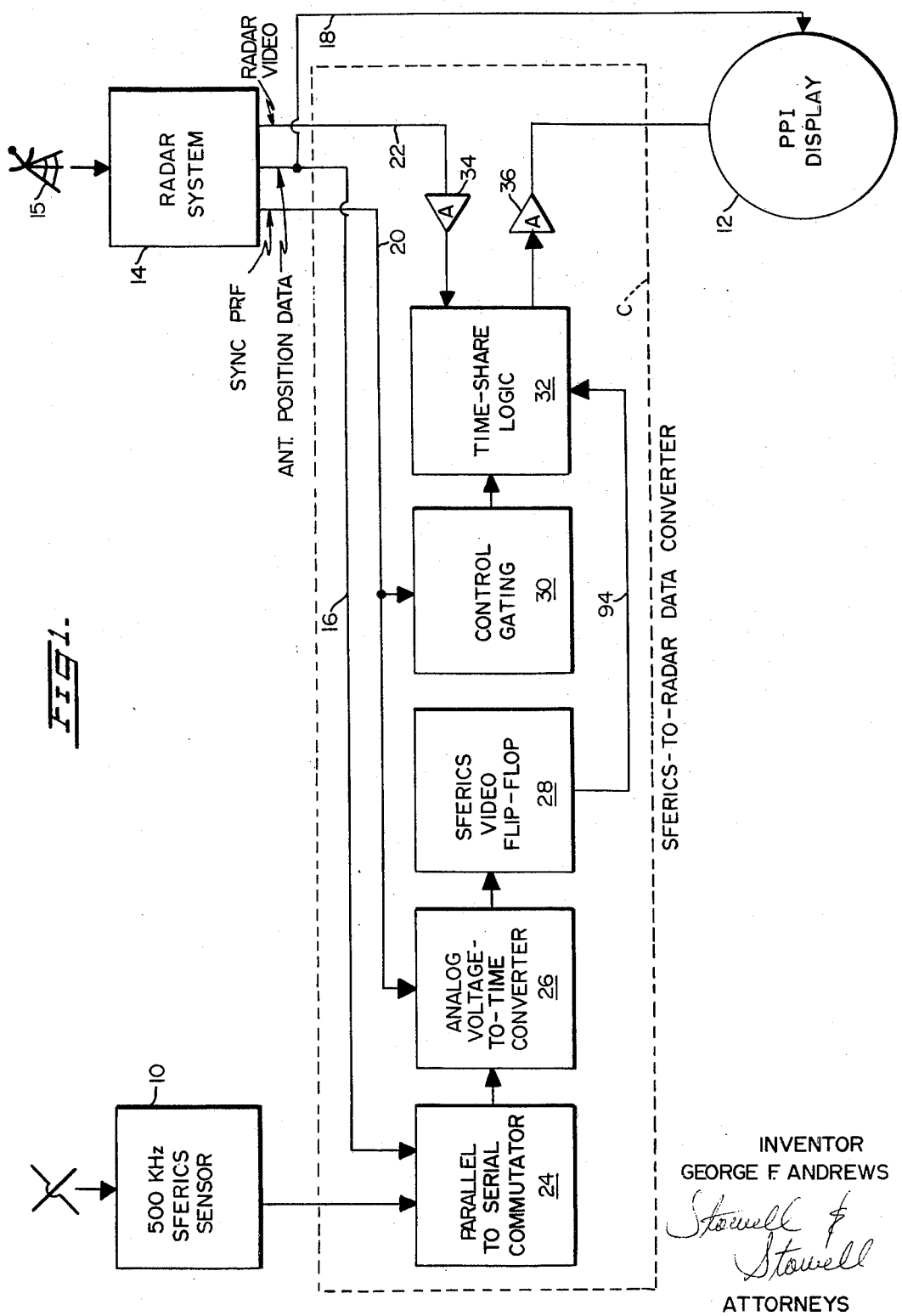
Figure 2:
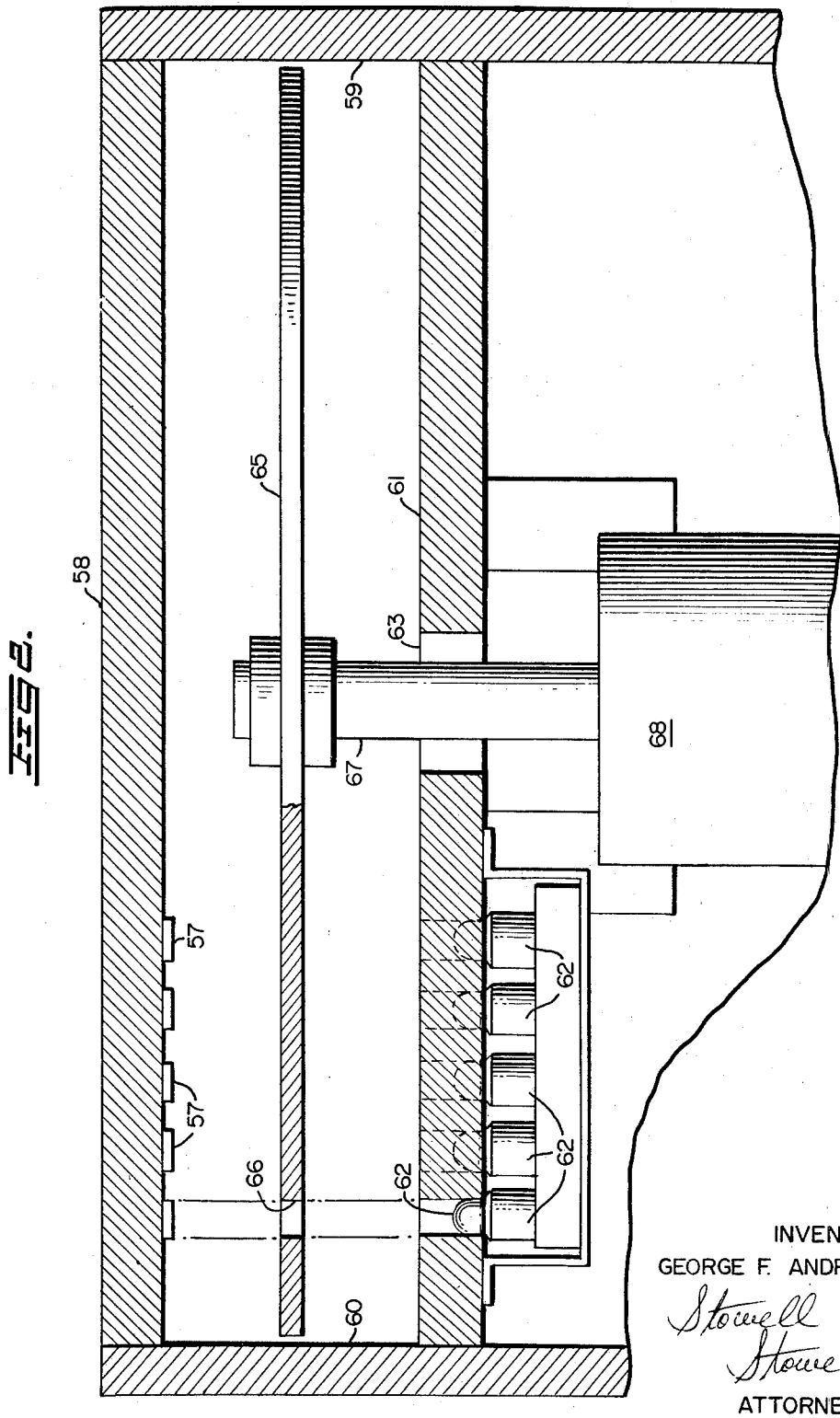
Figure 3:
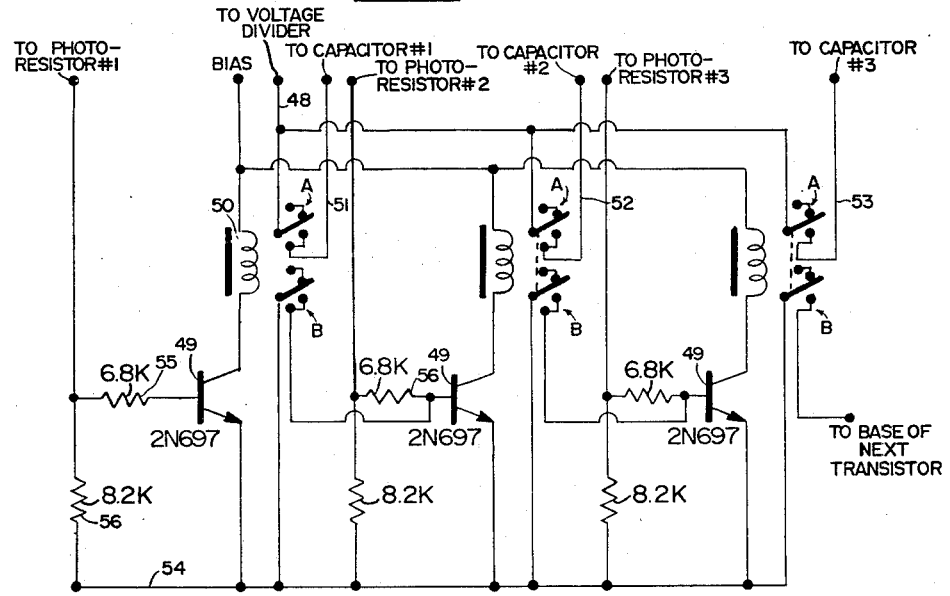
Figure 4:
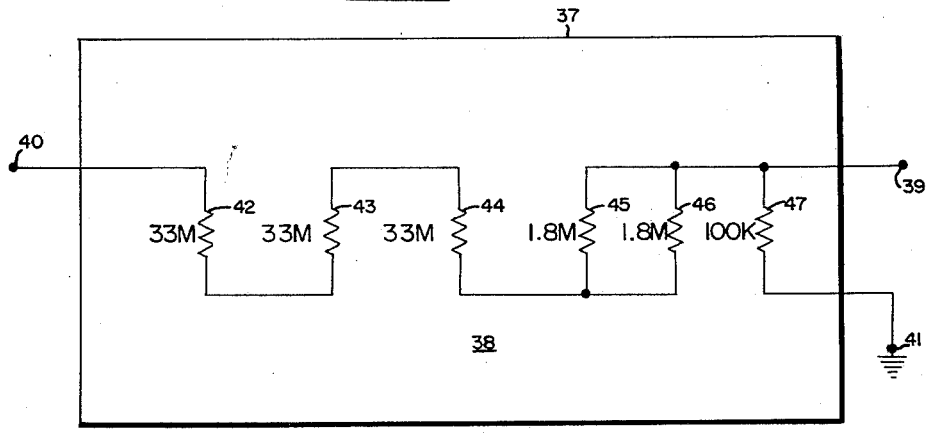
Figure 7:
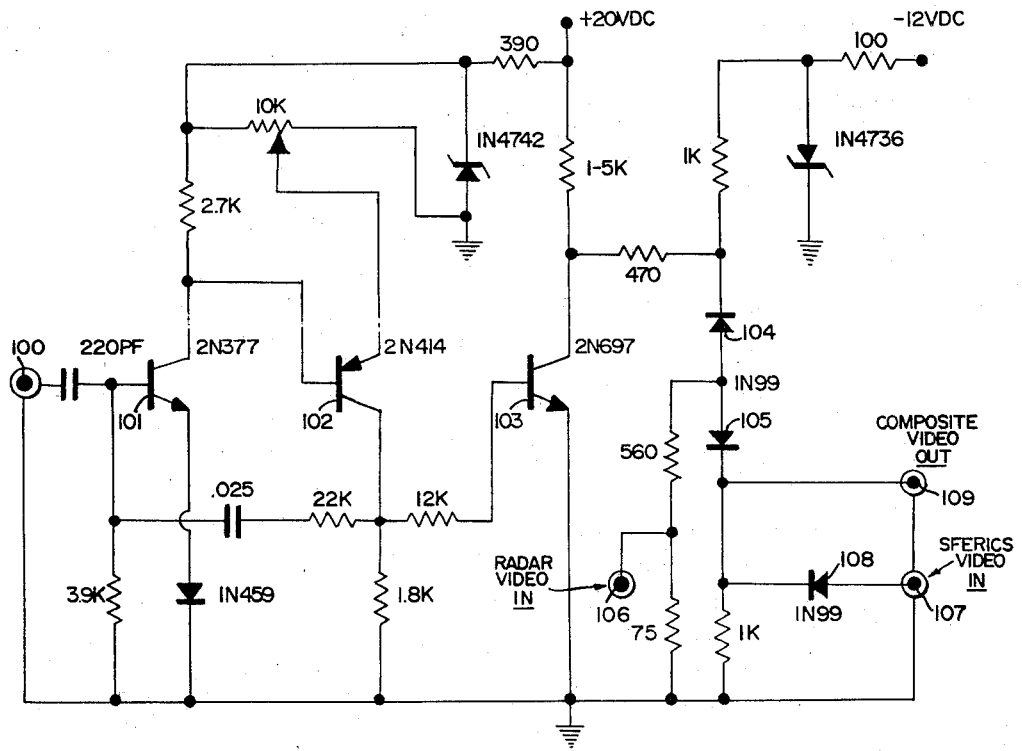
Figure 8:
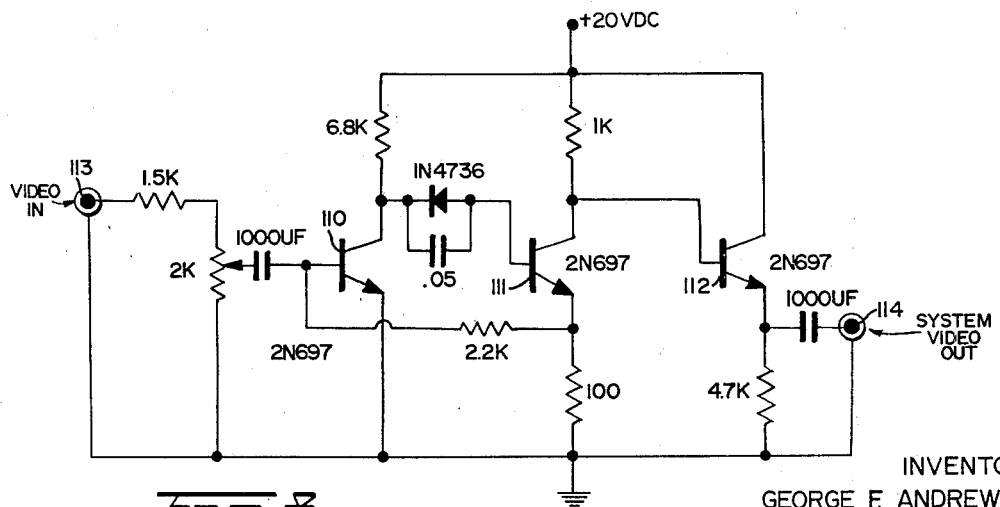
Figure 9:
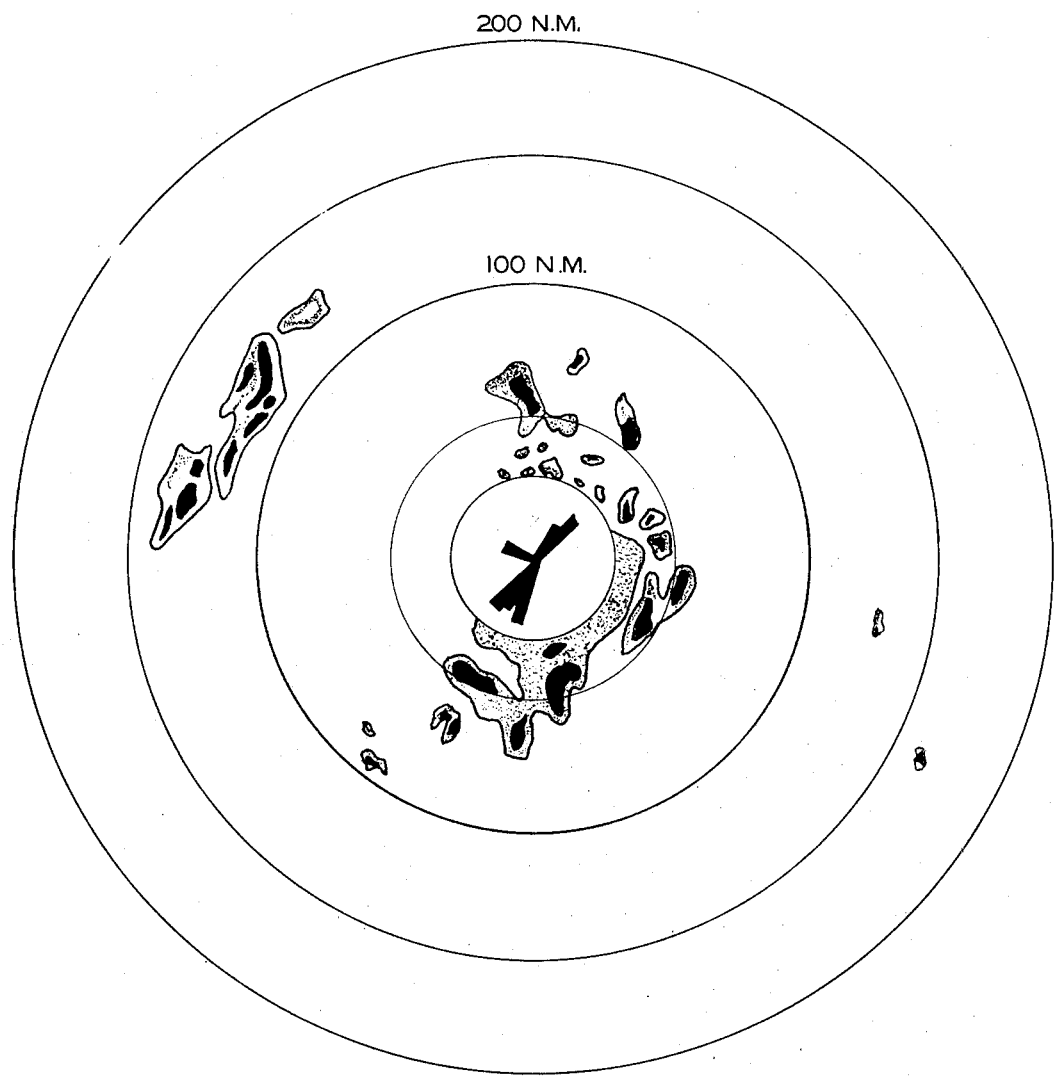

In the drawings:
FIGURE 1 is a system functional block diagram of a radar and sfercis display system embodying the present invention;
FIGURE 2 is a fragmentary, elevational view, partly in cross section, of packaging assembly of the photocell detectors of the parallel-to-serial commutator for sampling sferics data;
FIGURE 3 is a schematic diagram of the sequential sampler of the parallel-to-serial commutator;
FIGURE 4 is a schematic diagram of a voltage divider assembly;

FIGURE 5 is a schematic diagram of the analog voltage-to-time converter shown in block diagram form in FIGURE 1;
FIGURE 6 is a schematic diagram of the sferics video flip-flop block diagram of FIGURE 1;
FIGURE 7 is a schematic diagram of the control gating and time-sharing block of FIGURE 1;
FIGURE 8 is a schematic diagram of the video amplifier shown in block diagram form in FIGURE 1;
FIGURE 9 is a drawing of the composite CRT display showing a typical case of sferics vectors pointing toward radar echoes which contain significant electrical activity.

Referring now to the figures, and in particular to FIGURE 1, there is shown a system functional block diagram of a radar and sferics display embodying the present invention. Block 10 generally designates the sferics detection equipment which is commerically available from Litton Industries.

Briefly, the sferics sensor uses radio direction-finding techniques, i.e. additive and subtractive antenna pattern combinations, plus logic circuitry to determine the direction of arrival of atmospheric electrical activity at 500 kHz. To this end, the thunderstorm-sferics sensor comprises 64 channels, each having a corresponding capacitor capable of storing approximately 20 volts. Each capacitor stores information for aproximately 5.62° of azimuth so that all azimuths are represented in the storage system. This provides a total of 64 unambiguous sectors in which activity can be resolved.

The output signals of the sensor 10 consist of DC voltages stored in the capacitors. The charge on each capacitor presents an exponential histogram of recent past sferics activity which has occurred in a particular azimuth sector. The 64 capacitors are sequentially interrogated, with the outputs being converted to radar data compatible for presentation by the PPI 12, as the radar 14 scans in azimuth. The sferics data appears on the PPI display as vectors radiating from the center of the PPI scope at the proper azimuth. The vector lengths indicate the relative amounts of sferics activity and by analyzing a time-lapse sequence of the display, the growth and decay and life span of a thunderstorm can be studied. Significant operational advantages in weather forcasting also result, since by viewing the composite display in real time, one may ascertain which precipitation echoes contain severe electrical activity and which do not, as indicated in FIGURE 9.

Radar system 14 may be a conventional weather radar system. The data-converter may be conveniently used with radars of differing PRF, antenna rotation rate, wavelength, etc. Antenna position data is translated through lines 16 and 18 to the sferics-to-radar data converter C, shown within the rectangular block formed by the dash lines; and the PPI display 12, respectively, while sync data at the pulse repetition frequency and radar video are translated through lines 20 and 22, respectively, to the sferics-to-radar data converter C.

The sferics-to-radar converter comprises six basic stages: a parallel-to-serial commutator 24; an analog voltage-to-time converter 26, a sferics video flip-flop stage 28; a control gating stage 30 and a time-share logic stage 32. The further video amplifier stages 34 and 36 are provided for amplification of the radar video output and video output of the time-share logic stage 32 applied to the PPI display 12.

The parallel-to-serial commutator stage 24 comprises a photoelectric keying circuit and a transistor-relay circuit to sequentially sample each of the 64 storage capacitors of the sensor 10. To this end, 64 photoresistors are arranged to sequentially energize 64 transistor-relay pairs, one pair corresponding to each azimuth sector. The sampling or commutation is performed in synchronism with radar antenna rotation and connects the capacitors of the sensor across a voltage divider assembly 38 shown in FIG. 4, while presenting a high input impedance to the capacitors to prevent excessive discharging. The output of the voltage divider taken at terminal 39 is, thus, a fractional replica of the capacitor stored voltages of the sensor 10.

Referring to FIGURE 4, the voltage divider comprises a series-parallel network of resistors connected between input terminal 40 and ground terminal 41. Advantageously, three 33M resistors 42, 43, 44 are connected in series with two parallel 1.8M resistors 45 and 46, which are in turn serially connected with a 100K resistor 47 to present a total impedance to the capacitors of approximately $10^8$ ohms. Obviously, other combinations of values may be used, the total value depending on the tolerable limit of discharging. Terminal 40 is electrically connected to conductor 48 of the sequential sampler circuit of FIGURE 3 which also forms part of the parallel-to-serial commutator.

As should be apparent, in accordance with known packaging techniques, the individual circuits may be formed on insulative substrates, such as substrate 37 illustrated in connection with the voltage divider assembly. Further, as can be seen from FIGURE 3, each substrate may contain only a portion of the total circuit. Thus, each sequential sampler substrate has three transistor-relay pairs, and 22 interconnected substrates are used to mount the entire circuit in accordance with conventional packaging techniques.

Each relay pair comprises an NPN transistor 49 and a relay having an energizing winding 50 and two sets of contacts A and B. The energizing winding 50 is connected in the collector circuit of the corresponding transistor. For convenience, the upper set of contacts, as viewed in the drawing, have been labeled A and the lower set B. The A contacts are dead ended when the relay coil is de-energized. When the coil is energized, the A contacts connect the voltage divider assembly to the corresponding capacitor in the sensor. To this end, terminal 51 is connected to the capacitor corresponding to the first 5.62° sector, terminal 52 to the capacitor corresponding to the second sector, terminal 53 to the third capacitor, etc. The lower set or B contacts serve to connect the base electrode of each succeeding transistor to the common line 54. The base electrode of each transistor is also connected to biasing resistors 55 and 56 which have their junctions returned to a corresponding photoresistor so that firing of that transistor is controlled in response to illumination or excitation of the corresponding photoresistor.

Referring to FIGURE 2, there is disclosed a suitable mechanical packaging layout for the photoelectric keying circuit of commutator 24. Sixty-four photoresistors 57 are supported on plate 58 in an angularly spaced arrangement such that each photoresistor corresponds to a 5.62° sector. Plate 58 is supported by side members 59 and 60 in spaced relationship with lower plate 61 adapted to support sixty-four lamps 62. Each lamp 62 is adapted to illuminate at a predetermined position of the radar antenna a corresponding photoresistor. Adapted to rotate intermediate photoresistors is an opaque disc 65 having an aperture 66 aligned with the photoresistors and lamps. Disc 65 is mounted on the shaft 67 (passing through a central opening 63 in plate 61) of a selsyn 68 driven in synchronism with the weather radar antenna 15. It will be understood that the photoresistors and the sixty-four lamps are arranged in the form of equi-radius circles. As each photoresistor 57 is illuminated upon the passage of the aperture 66 between the photoresistor and the corresponding lamp 62, a pulse is applied to the base of the corresponding transistor 49 of the sequential sampler to cause the transistor to fire and energize its relay, the contacts of which are switched to connect the capacitor for that sector to the voltage divider. An additional set of relay contacts are connected to form an interlock such that the previous transistor has completed its sampling before the next succeeding one can be energized. This feature insures a positive and accurate sample of the discrete azimuth sectors. To enable application of a pulse upon illumination of a photoresistor, one end of each photoresistor is connected in common to a suitable bias source which may be, for example, a +20 volt D.C. supply. The other end of each photoresistor is connected to its coresponding transistor-relay pair of the sequential sampler as hereinbefore described.

The output from terminal 39 of the voltage divider assembly which is a fractional replica of the sensor capacitor stored voltages is applied to the input of the analog voltage-to-time converter 26. The amplitude of the stored charge on each successive capacitor is converted to a fixed amplitude pulse, beginning at the time of firing of the radar transmitter. The duration of the pulse is a linear function of the sampled capacitor voltage. However, for certain display situations, when a linear relationship between signal levels and displayed vector lengths is not desired, the commutated sferics sensor signal may be advantageously weighted to provide a non-linear relationship. Such weighting may be desirable to extend the dynamic range of the sferics display in order to preclude saturation of the display during periods of extremely severe atmospheric disturbances and/or lightning.

One suitable arrangement for providing a non-linear relationship varies the vector lengths of the display signal as the logarithm of the sferics signal level, rather than as a linear function of this level. In such a case, the output signals from the voltage divider may be translated through a pair of operational amplifiers coupled by a log resistance-diode voltage divider. The first operational amplifier transforms the signals from the voltage divider into a low source resistive impedance for driving a series connected log diode through the current source resistor. The second operational amplifier amplifies the resulting log function of the input signal.

FIGURE 5 illustrates schematically the analog-to-time converter which comprises a regenerative, monostable NPN-PNP transistor pair including transistors 70 and 71 and an amplifier transistor 72. The input signal from the voltage divider 38 representative of sferics activity is applied through terminal 39 connected to the base of transistor 72 and also simultaneously applied to the input of log function generator 76. The output of transistor 72 is translated through conductor 73 to a fixed contact 74 of a single pole double throw switch 75.

In the position shown, the switch is arranged for linear operation, that the vector lengths of the display signal are caused to vary as a linear function of the sferics signal level. In its other position, the input signal is translated through a logarithmic function generator 76 through switch 75 and to the emitter of the PNP transistor 71.

The regenerative, monostable transistor pair generates an output waveform taken across resistor 77 and applied through conductor 78 to the sferics video flip-flop 28. The output waveform is coincident with each radar triggering pulse applied through line 20 and terminal 79 to the base of transistor 70. The duration of the output pulse is a linear function of the positive voltage applied to the emitter of the PNP transistor 71. The range of time durations over which the output is variable is controlled by RC feedback elements 80 and 81.

For convenience, suggested values of the biasing components have been indicated in the drawings. The Zener diode coupling element 82 connected to the emitter of the PNP transistor 71 provides proper offset voltage such that no gate is produced when no signal is present from the sensor 10.

The variable duration gate signal is used to enable a crystal controlled multivibrator shown in FIG. 6 and comprising transistors 90 and 91 whose output frequency is set by a crystal 92 having an operating frequency of 496.296 kHz. The gate is applied to the base of input transistor 93, while the sferics video output pulse train appears on conductor 94 connected to the variable arm of resistor 95 in the emitter circuit of transistor 96.

The sferics video flip flop 28 converts the variable duration gate to a train of pulses whose recurrence rate is the frequency of the quartz crystal 92. Consequently, the duration of each pulse within the train is equal to:

$$\frac{\text{Period}}{2} = \frac{1}{\frac{F}{2}} = \frac{1}{\frac{486,296\ Hz}{2}} \approx 1 \times 10^{-6}\ \text{sec.}$$

This train of 1 microsecond pulses, spaced at intervals of 2 microseconds begins at radar firing time and continues for a time period equal to the duration of the input gate. If no sferics signals are present from the sensor, no gate is available to the flip flop 28 and no pulse train is generated. The sferics video pulses are now in proper form to be mixed with the conventional radar video and are applied to the time-share logic circuit 32.

To permit observation and study of the sferics data without overriding radar information, the radar video is inhibited for a finite time after each radar synchronizing impulse. The control gating and time-sharing logic circuits are shown in detail in FIGURE 7. Radar sync pulses are received at terminal 100 to cause a gating pulse to be developed by transistors 101, 102 and 103 for controlling firing of diodes 104 and 105. Radar video input is applied at terminal 106 and so long as diode 105 is blocked, only the sferics video input applied at terminal 107 is passed through diode 108 to the composite video output terminal 109. As diode 105 becomes unblocked, both radar and sferics video signals are translated through the output terminal 109 to video amplifier 36.

Video amplifiers 34 and 36 shown in FIG. 8 are identical. Amplifier 34 serves to adjust the radar video input to the time-share logic circuit to the desirable amplitude for handling within the circuit, while amplifier 36 normalizes the composite sferics and radar signals to the desirable level for input to the PPI display 12. Each amplifier comprises three 2N697 transistors 110, 111 and 112 with video input being applied to the base of transistor 110 through terminal 113. After three stages of amplification, the output is taken from the emitter of transistor 112 and applied through terminal 114 to the PPI display 12.

I claim:
1. A sferics-to-radar data converter comprising,
  (a) means for sequentially sampling the output of a sferics sensor having a plurality of output channels, said means providing an output signal over a single channel representative of atmospheric electrical activity,
  (b) means for converting said output signal to a gate signal having a fixed amplitude pulse and a width proportional to the magnitude of the output of the sferics sensor,
  (c) a multivibrator,
  (d) means for applying said gate signal to said multivibrator to provide an output pulse train indicative of the atmospheric electrical activity.

2. A sferics-to-radar data converter as set forth in claim 1 further including,
  (a) display means responsive to said output pulse train for providing a visual display of the atmospheric electrical activity,
  (b) means for translating said output pulse train to said display means.

3. A sferics-to-radar converter as set forth in claim 1 wherein,
  (a) said sampling means comprises a parallel-to-serial commutator,
  (b) said commutator having a plurality of inputs each adapted to be connected to a separate output of said sferics sensor and provide a sferics analog output signal indicative of the atmospheric electrical activity as detected by the sensor.

4. A sferics-to-radar converter as set forth in claim 3 wherein said (b) means is an analog voltage-to-time converter stage.

5. A sferics-to-radar data converter as set forth in claim 4 wherein said gate signal is a linear function of the sampled sferics output.

6. A sferics-to-radar data converter as set forth in claim 4 wherein said gate signal is a logarithmic function of the sampled sferics output.

7. A sferics-to-radar data converter as set forth in claim 4 further including,
  (a) a log function generator stage having an input and an output,
  (b) switch means adapted to be actuated between a first and a second position,
  (c) said switch means in its first position connecting the analog sferics output signal to the input of the analog converter,
  (d) said switch means in its second position connecting the output of the log function generator to the input of the analog converter,
  (e) whereby depending on a position of said switch means, the output of said analog converter is either a linear function or a logarithmic function of the sampled voltage.

8. A sferics-to-radar data converter as set forth in claim 4 wherein said analog converter comprises a monostable transistor pair adapted to develop an output signal as a function of said analog output signal and further including means for applying a triggering pulse to said monostable transistor pair.

9. A sferics-to-radar data converter as set forth in claim 4 wherein said multivibrator includes a crystal for setting the frequency of operation, said multivibrator being operable to convert the variable duration gate signal to a train of pulses whose recurrence rate is the frequency of the crystal.

10. A time sharing display system adapted to provide a composite visual display of thunderstorm precipitation and sferics activity as detected by a weather radar system and a sferics sensor comprising,
  (a) a data converter connected to receive the output signals of the sferics sensor and convert said output signals to signals compatible for presentation with video output signals of the weather radar system,
  (b) means for applying a synchronization signal to said data converter from the radar system to effect said conversion of said output signals in synchronism with the firing of the radar system transmitter,
  (c) said data converter having an output representing information obtained from the weather radar and the sferics sensor,
  (d) means for applying signals representing radar information to said data converter,
  (e) said data converter including means for inhibiting the signals representing radar information for a finite period and means for connecting the output of said data converter to said display means to provide a composite visual display.

11. A time sharing display system as set forth in claim 10 wherein,
  (a) said display means is a PPI delay including means for receiving positional information from said radar system,
  (b) said data converter further includes means for sampling the output of the sferics sensor in synchronism with said positional information.

12. A sferics-to-radar converter as set forth in claim 11 wherein said sampling means comprises,
  (a) a parallel-to-serial commutator,
  (b) said commutator having a plurality of inputs each adapted to be connected to a separate output of the sferics sensor and provide an analog output signal indicative of the atmospheric electrical activity as detected by the sensor.

13. A sferics-to-radar converter as set forth in claim 12 further including,
(a) an analog voltage-to-time converter stage,
(b) means for applying said analog output signal to the input of said analog voltage-to-time converter stage,
(c) said stage converting said analog output signal to a gate signal which is a function of the sampled outputs.

14. A sferics-to-radar data converter as set forth in claim 13 further including,
(a) a log function generator stage having an input and an output,
(b) switch means adapted to be actuated between a first and a second position,
(c) said switch means in its first position connecting the output of the log function generator to the input of the analog converter,
(d) said switch means in its second position connecting the output of the log function generator to the input of the analog converter,
(e) whereby depending on the position of the switch means the output of said analog converter is either a linear function or a logarithmic function of the sampled sensor output.

15. A sferics-to-radar converter as set forth in claim 13 wherein said analog converter comprises,
(a) a monostable transistor pair adapted to develop an output signal as a function of said analog output signal,
(b) means for applying a triggering pulse to said monostable transistor pair.

16. A sferics-to-radar converter as set forth in claim 15 further including a multivibrator having a crystal for setting the frequency of operation, said multivibrator being operable to convert the variable duration gate signal to a train of pulses whose recurrence rate is the frequency of the crystal.

17. A time sharing display system adapted to present a composite display of information related to thunderstorm precipitation and sferics activity as detected by a weather radar and a sferics sensor arranged to develop, respectively, output signals indicative of the magnitude and direction of thunderstorm and atmospheric electrical activity comprising,
(a) a data converter,
(b) means for applying the radar output signals to said converter,
(c) said converter including means for sampling the output signals of the sferics sensor in synchronism with the relative position of the antenna of the weather radar and developing an analog signal proportional to the sampled output signals,
(d) means for converting the analog output signal into a variable duration gate signal,
(e) a multivibrator adapted to provide an output pulse train in response to the duration of said gate signal,
(f) means for applying said gate signal to said multivibrator,
(g) a control gating and time-share logic stage adapted to inhibit the radar output signals for a finite period,
(h) means for connecting the output of said data converter to the display system to provide said composite display.

References Cited

UNITED STATES PATENTS

| | | | |
|---|---|---|---|
| 1,893,337 | 1/1933 | Patterson | 324—72 |
| 2,584,971 | 2/1952 | Allison | 343—112 |
| 2,637,841 | 5/1953 | Davis et al. | 343—112 X |
| 3,245,078 | 4/1966 | Kohl | 343—112 |
| 3,287,726 | 11/1966 | Atlas | 343—11 X |

RODNEY D. BENNETT, Jr., Primary Examiner

M. F. HUBLER, Assistant Examiner

U.S. Cl. X.R.

73—170; 324—72; 343—5, 112